(12) United States Patent
Peng et al.

(10) Patent No.: US 12,119,986 B2
(45) Date of Patent: Oct. 15, 2024

(54) NETWORK SLICE CREATION METHOD AND APPARATUS, AND PACKET FORWARDING METHOD AND APPARATUS

(71) Applicant: ZTE Corporation, Shenzhen (CN)

(72) Inventors: Shaofu Peng, Shenzhen (CN); Feicai Jin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 341 days.

(21) Appl. No.: 17/786,339

(22) PCT Filed: Dec. 21, 2020

(86) PCT No.: PCT/CN2020/122492
§ 371 (c)(1),
(2) Date: Jun. 16, 2022

(87) PCT Pub. No.: WO2021/129085
PCT Pub. Date: Jul. 1, 2021

(65) Prior Publication Data
US 2023/0032778 A1 Feb. 2, 2023

(30) Foreign Application Priority Data
Dec. 25, 2019 (CN) .......................... 201911355517.1

(51) Int. Cl.
*H04L 41/0806* (2022.01)
*H04L 41/40* (2022.01)
*H04L 41/5054* (2022.01)
(52) U.S. Cl.
CPC .......... *H04L 41/0806* (2013.01); *H04L 41/40* (2022.05); *H04L 41/5054* (2013.01)

(58) Field of Classification Search
CPC . H04L 41/0803; H04L 41/0806; H04L 41/40; H04L 41/5054; H04L 41/5096; H04L 45/12; H04L 45/50
See application file for complete search history.

(56) References Cited

U.S. PATENT DOCUMENTS 9,397,913 B1 * 7/2016 Nimmagadda ..... H04L 43/0835
11,929,915 B2 * 3/2024 Chen .................... H04L 41/122
(Continued)

FOREIGN PATENT DOCUMENTS

| CN | 101013995 A | 8/2007 |
| CN | 103780431 A | 5/2014 |
| CN | 110233765 A | 9/2019 |

OTHER PUBLICATIONS

International Search Report for corresponding application PCT/CN2020/122492 filed Oct. 21, 2020; Mail date Jan. 22, 2021.

*Primary Examiner* — Siu M Lee
(74) *Attorney, Agent, or Firm* — CANTOR COLBURN LLP (57) ABSTRACT

A network slice creation method and apparatus, and a packet forwarding method and apparatus are provided. The network slice creation method includes: respectively configuring Traffic Engineering (TE) affinity attributes for layer-2 member links in a layer-3 bundled link, and flooding the TE affinity attributes of the layer-2 member links by using Interior Gateway Protocol (IGP); and then creating, according to the TE affinity attributes of the layer-2 member links and by using a Flex Algorithm (FA), network slices containing the layer-2 member links.

20 Claims, 5 Drawing Sheets

Respectively configuring TE affinity attributes for layer-2 member links in a layer-3 bundled link, and flooding the TE affinity attributes of the layer-2 member links by using IGP — S110

Creating, according to the TE affinity attributes of the layer-2 member links and by using an FA, network slices containing the layer-2 member links — S120

(56) References Cited

U.S. PATENT DOCUMENTS

2016/0353422 A1   12/2016  Vrzic
2019/0200209 A1    6/2019  Velev
2022/0045944 A1*  2/2022  Sun ...................... H04L 5/0058

* cited by examiner

Respectively configuring TE affinity attributes for layer-2 member links in a layer-3 bundled link, and flooding the TE affinity attributes of the layer-2 member links by using IGP — S110

Creating, according to the TE affinity attributes of the layer-2 member links and by using an FA, network slices containing the layer-2 member links — S120

Fig. 4

| Type | Length | Flags | Reserved |
|------|--------|-------|----------|
| Administrative group (color) of L2 bundle Member 1 ||||
| Administrative group (color) of L2 bundle Member 2 ||||
| ...... ||||
| Administrative group (color) of L2 bundle Member N ||||

NETWORK SLICE CREATION METHOD AND APPARATUS, AND PACKET FORWARDING METHOD AND APPARATUS

CROSS REFERENCE

This application is a National Stage Filing of the PCT International Application No. PCT/CN2020/122492 filed on Oct. 21, 2020, which claims priority to Chinese Application No. 201911355517.1 filed on Dec. 25, 2019, the entirety of which is herein incorporated by reference.

TECHNICAL FIELD

Embodiments of the present disclosure relate to, but are not limited to, the technical field of communications, and particularly relate to a network slice creation method and apparatus, and a packet forwarding method and apparatus.

BACKGROUND

The core requirement of 5G network slices for a bearer network is that different network slices need their dedicated bearer sub-networks. Strict resource hard isolation or soft isolation that reaches an approximate hard isolation effect can be realized between different dedicated bearer sub-networks. Since a packet network cannot support hard isolation, in order to support the requirements of the 5G network slices, slice division needs to be carried out on underlying network resources in the packet network, so as to meet the requirements of different upper-layer services. A conventional method is to use Interior Gateway Protocol (IGP) Flex Algorithm (FA) technology to run a plurality of IGP algorithms in the same topology, so as to calculate a plurality of FA planes, each FA plane can represent one network slice, and different upper-layer service traffics can be loaded on different FA planes.

In order to support the creation and deletion of network slices more simply and flexibly, and minimize the impact of slice services on the bearer network, a currently adopted method is to establish a layer-3 bundled link between two adjacent nodes in an IGP domain, and the layer-3 bundled link contains at least two layer-2 member links that are dedicated to a specific network slice. By carrying an adjacent segment identifier corresponding to a specific layer-2 member link in a forwarding packet, it is possible to direct the packet to be forwarded to the layer-2 member link. However, since the currently adopted network slicing method limits that each layer-3 bundled link can only be applied to one network slice, that is, since each layer-2 member link under the layer-3 bundled link corresponds to the same network slice, the division flexibility of network slices between adjacent nodes is affected, and it is impossible to support a scenario in which the layer-2 member links belong to different network slices, respectively.

SUMMARY

The following description is an overview of the subject-matter detailed herein. The overview is not intended to limit the protection scope of claims.

In a first aspect, embodiments of the present disclosure provide a network slice creation method and apparatus, and a packet forwarding method and apparatus, which can support a scenario in which various layer-2 member links under a layer-3 bundled link respectively belong to different network slices, such that the division flexibility of network slices can be improved.

In a second aspect, the embodiments of the present disclosure provide a network slice creation method, including: respectively configuring Traffic Engineering (TE) affinity attributes for layer-2 member links in a layer-3 bundled link, and flooding the TE affinity attributes of the layer-2 member links by using IGP; and creating, according to the TE affinity attributes of the layer-2 member links and by using an FA, network slices containing the layer-2 member links.

In a third aspect, the embodiments of the present disclosure provide a packet forwarding method, including: respectively configuring TE affinity attributes for layer-2 member links in a layer-3 bundled link, and flooding the TE affinity attributes of the layer-2 member links by using IGP; creating, according to the TE affinity attributes of the layer-2 member links and by using an FA, network slices containing the layer-2 member links; and establishing a forwarding path to a destination node according to the network slices, and forwarding a packet based on the forwarding path.

In a fourth aspect, the embodiments of the present disclosure provide a network slice creation apparatus, including: a memory, a processor, and a computer program stored on the memory and executable on the processor, wherein when executing the computer program, the processor implements the network slice creation method in the second aspect as described above.

In a fifth aspect, the embodiments of the present disclosure provide a packet forwarding apparatus, including: a memory, a processor, and a computer program stored on the memory and executable on the processor, wherein when executing the computer program, the processor implements the packet forwarding method in the third aspect as described above.

In a sixth aspect, the embodiments of the present disclosure provide a computer-readable storage medium, in which computer-executable instructions are stored, wherein the computer-executable instructions are used for executing the network slice creation method or the packet forwarding method.

The embodiments of the present disclosure include: respectively configuring TE affinity attributes for layer-2 member links in a layer-3 bundled link, and flooding the TE affinity attributes of the layer-2 member links by using IGP; and then creating, according to the TE affinity attributes of the layer-2 member links and by using an FA, network slices containing the layer-2 member links. According to the solutions provided by the embodiments of the present disclosure, by respectively configuring the TE affinity attributes for the layer-2 member links in the layer-3 bundled link, and flooding the TE affinity attributes of the layer-2 member links by using IGP, each node in a current IGP domain stores layer-3 bundled link information of all nodes in the current IGP domain, and the layer-3 bundled link information contains specific TE affinity attributes of respective layer-2 member links. Since the network slices containing the layer-2 member links are created according to the TE affinity attributes of the layer-2 member links and by using the FA, different network slices can correspond to different layer-2 member links, so that each network slice can have the TE affinity attribute of one or more corresponding layer-2 member links, that is, one or more layer-2 member links with the same TE affinity attribute can form a network slice. Therefore, it is possible to support a scenario in which the layer-2 member links under the layer-3 bundled link respectively belong to different network slices, the division flexibility of the network slices can be improved, and accordingly traffic differentiation and isolation between the network slices can be realized.

Other features and advantages of the embodiments of the present disclosure will be set forth in the following description, and in part will be apparent from the description, or will be understood by the practice of the embodiments of the present disclosure. The objectives and other advantages of the embodiments of the present disclosure can be implemented and obtained by structures that are particularly pointed out in the description, claims and drawings.

BRIEF DESCRIPTION OF THE DRAWINGS

The drawings are used for providing a further understanding of the technical solutions of the embodiments of the present disclosure, constitute a part of the description, are used for explaining the technical solutions of the present disclosure together with the embodiments of the present disclosure, but do not constitute limitations to the technical solutions of the present disclosure.

DETAILED DESCRIPTION

In order to make the objectives, technical solutions and advantages of the present disclosure clearer, the present disclosure will be further described in detail below in combination with the drawings and embodiments. It should be understood that, the exemplary embodiments described herein are only used for explaining the present disclosure, rather than limiting the present disclosure.

It should be illustrated that, although functional modules are divided in the schematic diagrams of the apparatuses, and a logical sequence is shown in a flowchart, in some cases, the operations shown or described can be executed different from the module division of the apparatuses or the sequences in the flowchart. The terms "first", "second" and the like in the description, the claims and the above drawings are used for distinguishing similar objects, and are not necessarily used for describing a particular order or sequence.

The embodiments of the present disclosure provide a network slice creation method and apparatus, and a packet forwarding method and apparatus. By respectively configuring TE affinity attributes for layer-2 member links in a layer-3 bundled link, and flooding the TE affinity attributes of the layer-2 member links by using IGP, each node in the current IGP domain can store layer-3 bundled link information of all nodes in the current IGP domain, and the layer-3 bundled link information contains specific TE affinity attributes of respective layer-2 member links. In addition, network slices containing the layer-2 member links are created according to the TE affinity attributes of the layer-2 member links and by using an FA, so that different network slices can correspond to different layer-2 member links. In this way, each network slice can have the TE affinity attribute of one or more corresponding layer-2 member links, that is, one or more layer-2 member links with the same TE affinity attribute can form a network slice. Therefore, it is possible to support a scenario in which the layer-2 member links under the layer-3 bundled link respectively belong to different network slices, and the division flexibility of the network slices can be improved. In addition, when service packets in different network slices are forwarded, specific layer-2 member links can be specified as the forwarding outbound interfaces according to the TE affinity attributes, such that traffic differentiation and isolation between the network slices can be realized.

The embodiments of the present disclosure will be further described below in combination with the drawings.

Figure 1:
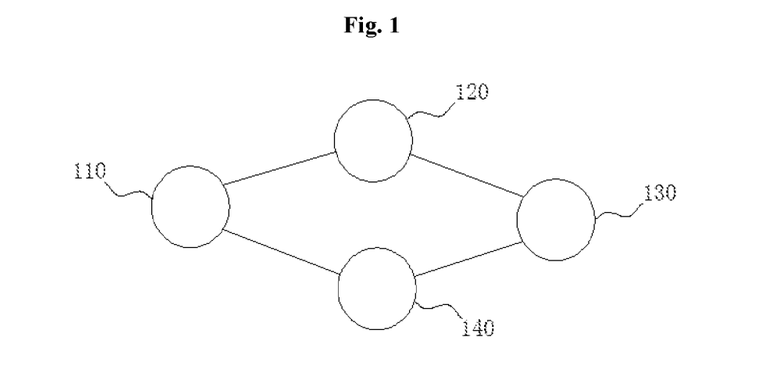
FIG. 1 is a schematic diagram of a network topology for executing a network slice creation method or a packet forwarding method provided by an embodiment of the present disclosure.

As shown in FIG. 1, FIG. 1 is a schematic diagram of a network topology for executing a network slice creation method or a packet forwarding method provided by an embodiment of the present disclosure. In the example of FIG. 1, the network topology includes a first node 110, a second node 120, a third node 130 and a fourth node 140, wherein the first node 110, the second node 120 and the third node 130 are connected in sequence, and the fourth node 140 is connected to the first node 110 and the third node 130, respectively. The first node 110, the second node 120, the third node 130 and the fourth node 140 may be network devices such as routers or switches, and can forward packets. In addition, the network topology may further include a network controller (not shown in FIG. 1), such as a Software Defined Network (SDN) controller. The network controller is respectively connected to the first node 110, the second node 110, the third node 130 and the fourth node 140, and can respectively control the first node 110, the second node 110, the third node 130 and the fourth node 140.

The first node 110, the second node 120, the third node 130, the fourth node 140 and the network controller respectively include a memory and a processor, wherein the memory and the processor can be connected by a bus or in other ways.

As a non-transitory computer-readable storage medium, the memory can be configured to store non-transitory software programs and non-transitory computer-executable programs. Additionally, the memory may include a high-speed random access memory, and may further include a non-transitory memory, such as at least one magnetic disk storage device, a flash memory device, or other non-transitory solid-state storage devices. In some embodiments, the memory may optionally include memories that are arranged remotely relative to the processor, and these memories may be connected to the processor by a network. Instances of the network include, but are not limited to, the Internet, an intranet, a local area network, a mobile communication network, and combinations thereof.

Each of the first node 110, the second node 120, the third node 130 and the fourth node 140 may have one or more parent interfaces for forwarding packets, and each node is connected to an adjacent node via the parent interface. In some embodiments, the parent interface may include a plurality of sub-interfaces, the sub-interfaces may be physical interfaces or logical interfaces, and correspondingly, the parent interface may also be a physical interface or a logical interface. According to the above structure description, the connection mode between two adjacent nodes may include the following connection modes.

Figure 2A:
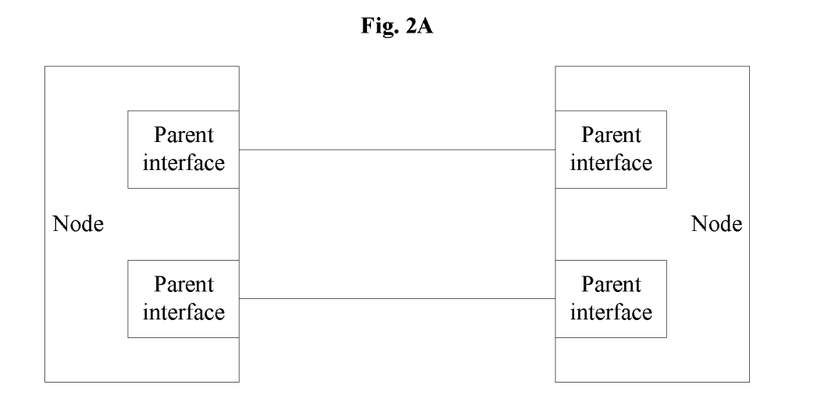
FIG. 2A is a schematic diagram of an embodiment of a link structure between two adjacent nodes in the network topology shown in FIG. 1.
Figure 2B:
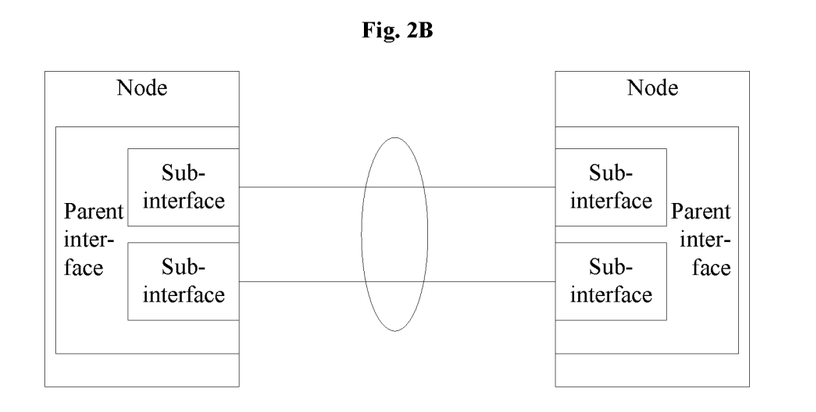
FIG. 2B is a schematic diagram of another embodiment of a link structure between two adjacent nodes in the network topology shown in FIG. 1.
Figure 2C:
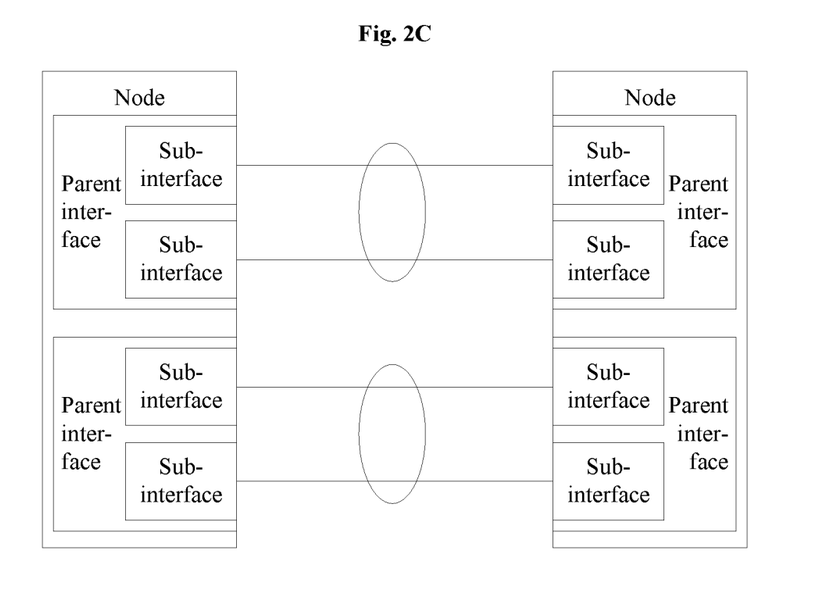
FIG. 2C is a schematic diagram of another embodiment of a link structure between two adjacent nodes in the network topology shown in FIG. 1.

1. As shown in FIG. 2A, at least one connection link is formed between two adjacent nodes via at least one parent interface, and the parent interface has no sub-interface, then the connection link may be a layer-3 link or a layer-2 link.
2. As shown in FIG. 2B, a main connection link is formed between two adjacent nodes via a parent interface, and the parent interface has at least two sub-interfaces, that is, there are at least two sub-connection links between two adjacent nodes, and when the main connection link is a layer-3 bundled link, each sub-connection link is a layer-2 member link that constitutes the layer-3 bundled link.
3. As shown in FIG. 2C, at least two main connection links are formed between two adjacent nodes via at least two parent interfaces, and the parent interface has at least two sub-interfaces, that is, corresponding to each main connection link, there are at least two sub-connection links between two adjacent nodes, and when the main connection link is a layer-3 bundled link, each sub-connection link in each main connection link is a layer-2 member link that constitutes the layer-3 bundled link.

It is worth noting that, when a connection link supports to be configured with an Internet Protocol (IP) address, supports the sending and receiving of IP packets, and enables IGP routing protocol, then the connection link can be called a layer-3 link, and otherwise, the connection link is called a layer-2 link. When the layer-3 link is a bundled link, that is, when at least two layer-2 links are bundled together to form the layer-3 link, the layer-3 link is a layer-3 bundled link, and each layer-2 link constituting the layer-3 bundled link is a layer-2 member link of the layer-3 bundled link.

The network topology and application scenarios described in the embodiments of the present disclosure are for the purpose of illustrating the technical solutions of the embodiments of the present disclosure more clearly, and do not constitute limitations to the technical solutions provided by the embodiments of the present disclosure. Those having ordinary skill in the art will appreciate that, with the evolution of the network topology and the emergence of new application scenarios, the technical solutions provided by the embodiments of the present disclosure are also applicable to similar technical problems.

It can be understood by those having ordinary skill in the art that, the structure of each node shown in FIG. 1 does not constitute a limitation to the embodiments of the present disclosure, and may include more or less components than those shown in the figures, or combine some components, or have different component layouts.

In the network topology shown in FIG. 1, each node can respectively invoke a network slice creation program or packet forwarding program stored therein, the network controller may also invoke the network slice creation program or packet forwarding program stored therein, and the node and the network controller cooperate with each other to execute a network slice creation method or a packet forwarding method.

Based on the above-mentioned network topology and the structures of each node and the network controller in the above-mentioned network topology, various embodiments of the network slice creation method and various embodiments of the packet forwarding method of the present disclosure are described as follows.

Figure 3:
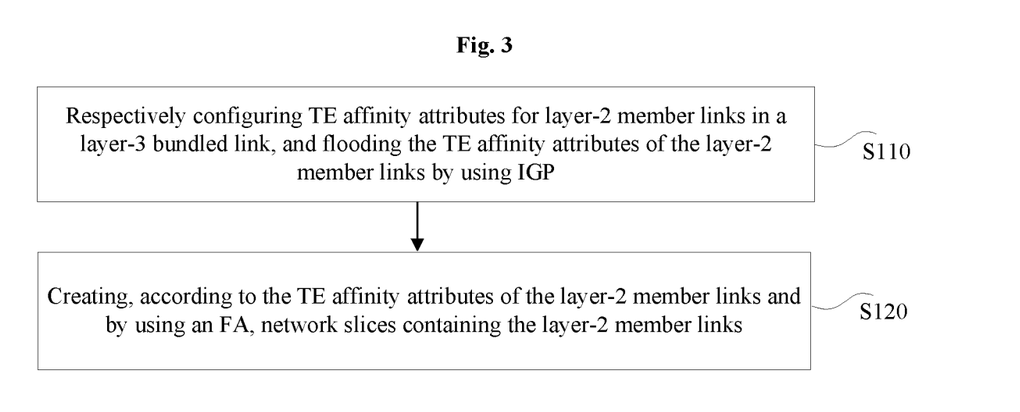
FIG. 3 is a flowchart of a network slice creation method provided by an embodiment of the present disclosure.

As shown in FIG. 3, FIG. 3 is a flowchart of a network slice creation method provided by an embodiment of the present disclosure. The network slice creation method includes, but is not limited to, the following operations.

At operation S110, TE affinity attributes are respectively configured for layer-2 member links in a layer-3 bundled link, and the TE affinity attributes of the layer-2 member links are flooded by using IGP.

Those having ordinary skill in the art can understand that, the TE affinity attribute includes a 32-bit (or more than 32-bit) vector and a 32-bit (or more than 32-bit) mask, which are used for describing link attributes required by a newly created TE tunnel. Each bit in the 32-bit vector represents an attribute, which can be used in path selection for the TE tunnel. Specifically, when a message is distributed in the network by flooding, every time the message passes a node, it is necessary to select, according to the affinity attribute configured to the TE tunnel, a suitable path for continued transmission to a destination node. The selection method is to compare the TE affinity attribute carried in the message with the link attribute that is configured for each link with enabled TE capability on the current node, and take the path that passes the matching selection as the path selected for the TE tunnel in the current node.

In an embodiment, a link state database may be established and maintained in each node, and the link state database may contain capability information of all nodes in the current IGP domain, information of layer-3 links for connecting these nodes, and prefix information notified by each node, etc. Therefore, the TE affinity attribute of each layer-3 link in the current IGP domain is stored in corresponding information of the layer-3 link in the link state database. In particular, when the layer-3 link is a layer-3 bundled link, by means of configuring unique TE affinity attributes for the layer-2 member links in the layer-3 bundled link, and flooding the TE affinity attributes of the layer-2 member links by using IGP, the layer-3 bundled link information in the link state database of each node in the current IGP domain contains specific TE affinity attributes of respective layer-2 member links.

In an embodiment, after the TE affinity attributes are configured for the layer-2 member links in the layer-3 bundled link, the TE affinity attribute of the layer-3 bundled link itself includes the TE affinity attributes of all layer-2 member links. As an illustrative example, assuming that a certain layer-3 bundled link contains three layer-2 member links, and the TE affinity attributes of the three layer-2 member links are configured to be three colors, that is, "red", "green" and "blue", respectively, then the TE affinity attribute of the layer-3 bundled link has these three colors at the same time.

In an embodiment, with regard to the operation of respectively configuring the TE affinity attributes for the layer-2 member links in the layer-3 bundled link, and flooding the TE affinity attributes of the layer-2 member links by using IGP, there may be different embodiments. For example, the TE affinity attributes of the layer-2 member links in the layer-3 bundled link may be notified by extending Intermediate System to Intermediate System (ISIS) protocol, or the TE affinity attributes of the layer-2 member links in the layer-3 bundled link may be notified by extending Open Shortest Path First (OSPF) protocol, which is not specifically limited in the present embodiment. When the TE affinity attributes of the layer-2 member links in the layer-3 bundled link are notified by extending ISIS protocol, the TE affinity attributes may be configured by adding new fields in an ISIS protocol message, and distributing the ISIS protocol message, that is configured with the TE affinity attributes, via flooding. When the TE affinity attributes of the layer-2 member links in the layer-3 bundled link are notified by extending OSPF protocol, the TE affinity attributes may be configured according to the provisions of the existing protocol, and an OSPF protocol message that is configured with the TE affinity attributes may be distributed via flooding.

At operation S120, network slices containing the layer-2 member links are created according to the TE affinity attributes of the layer-2 member links and by using an FA.

Those having ordinary skill in the art can understand that, the FA is an algorithm applied to IGP. A group of algorithm constraint conditions may be defined as required, and forwarding paths that satisfy the algorithm constraint conditions are generated based on the algorithm constraint conditions, therefore it is possible to generate network slices dedicated to specific service traffics according to these forwarding paths. In the present embodiment, by using the characteristic that the algorithm constraint conditions of the FA can be flexibly defined, different algorithm constraint conditions may be defined for different network slices, for example, corresponding to the TE affinity attributes of the layer-2 member links in the present embodiment, the layer-2 member links that satisfy different algorithm constraint conditions may constitute different network slices.

At present, the TE affinity attributes are only configured on layer-3 links or layer-3 bundled links, so that various nodes of the layer-3 link with the same TE affinity attribute in the network are grouped into the same network slice, so as to realize the forwarding of the specific dedicated service traffics. However, since the currently adopted network slicing method limits that each layer-3 link or layer-3 bundled link can only be applied to one network slice, that is, various layer-2 member links under the layer-3 bundled link correspond to the same network slice, such that the division flexibility of network slices between adjacent nodes is affected, and it is impossible to support a scenario in which the layer-2 member links respectively belong to different network slices. In view of this problem, the present embodiment utilizes the above operations S100 and S200, that is, by respectively configuring the TE affinity attributes for the layer-2 member links in the layer-3 bundled link, and flooding the TE affinity attributes of the layer-2 member links by using IGP, each node in the current IGP domain may store the layer-3 bundled link information of all nodes in the current IGP domain, and the layer-3 bundled link information contains specific TE affinity attributes of respective layer-2 member links. In addition, the network slices containing the layer-2 member links are created according to the TE affinity attributes of the layer-2 member links and by using the FA, so that different network slices may correspond to different layer-2 member links. In this way, each network slice can have the TE affinity attribute of one or more corresponding layer-2 member links, that is, one or more layer-2 member links with the same TE affinity attribute can form a network slice. Therefore, it is possible to support a scenario in which the layer-2 member links under the layer-3 bundled link respectively belong to different network slices, the division flexibility of the network slices can be improved, and accordingly traffic differentiation and isolation between the network slices can be realized.

Figure 4:
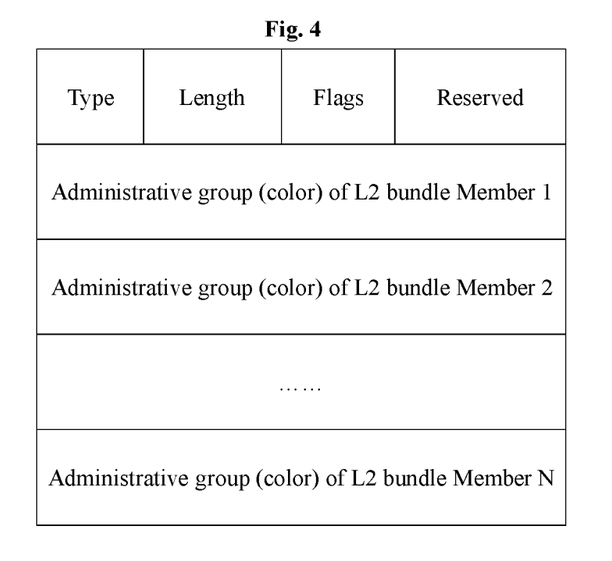
FIG. 4 is a schematic diagram of a message structure of fields for representing TE affinity attributes provided by an embodiment of the present disclosure.

As shown in FIG. 4, in an embodiment, in a case where IGP is ISIS protocol, fields for representing the TE affinity attributes of the layer-2 member links are set in an ISIS protocol message.

In an embodiment, after the TE affinity attributes are respectively configured for the layer-2 member links in the layer-3 bundled link, in a case where IGP is ISIS protocol, by setting the fields for representing the TE affinity attributes of the layer-2 member links in the ISIS protocol message, during the flooding of the ISIS protocol message, the TE affinity attributes of the layer-2 member links can be notified to various nodes, such that the link state databases in the nodes can store the TE affinity attributes corresponding to different layer-2 member links. Therefore, according to one or more layer-2 member links with the same TE affinity attribute, network slices for different dedicated service traffics can be realized between different nodes. As a result, it is possible to support a scenario in which the layer-2 member links under the layer-3 bundled link respectively belong to different network slices, the division flexibility of the network slices can be improved, and accordingly traffic differentiation and isolation between the network slices can be realized.

A specific example is described below for illustration.

In an embodiment, for an ISIS protocol message structure provided with fields for representing the TE affinity attributes of the layer-2 member links, reference can be made to the message structure shown in FIG. 4. In the message structure shown in FIG. 4, a plurality of attribute fields for respectively representing the TE affinity attributes of different layer-2 member links are newly added. In the message structure, the explanations of various fields are as follows.

"Type" occupies 1 byte and is used for indicating that the present field is a field for presenting the TE affinity attribute of the layer-2 member link;

"Length" occupies 1 byte and is capable of representing the number of layer-2 member links;

"Flags" occupies 1 byte and serves as an identification field;

"Reserved" occupies 1 byte serves as a reserved field for future use;

"Administrative group (color) of L2 Bundle Member 1" occupies 4 bytes, and indicates the value of the TE affinity attribute of the first layer-2 member link;

"Administrative group (color) of L2 Bundle Member 2" occupies 4 bytes, and indicates the value of the TE affinity attribute of the second layer-2 member link; and "Administrative group (color) of L2 Bundle Member N" occupies 4 bytes, and indicates the value of the TE affinity attribute of the Nth layer-2 member link.

It is worth noting that, in the L2 Bundle Member Attributes sub-TLV specified in the existing ISIS protocol, it is specified that it is necessary to specify the number of the contained layer-2 member links and list the identifiers of the layer-2 member links in sequence. Therefore, in the newly added fields for representing the TE affinity attributes of the layer-2 member links in the present embodiment, it is also suggested to list the TE affinity attribute of each layer-2 member link in the same sequence.

In addition, in an embodiment, a link resource selection rule is correspondingly provided for each network slice, and the link resource selection rule is used for selecting one or more layer-2 member links with a corresponding TE affinity attribute.

In the present embodiment, since the network slices containing the layer-2 member links are created according to the TE affinity attributes of the layer-2 member links and by using the FA, each network slice may correspondingly have a link resource selection rule, and the link resource selection rule is used for selecting one or more layer-2 member links with a corresponding TE affinity attribute. Therefore, just by respectively configuring the TE affinity attributes for the layer-2 member links, and flooding the TE affinity attributes of the layer-2 member links by using IGP, corresponding layer-2 member links can constitute a network slice according to the same TE affinity attribute. One layer-3 bundled link contains a plurality of layer-2 member links, and the layer-2 member links have different TE affinity attributes, therefore one layer-3 bundled link may be divided into a plurality of different network slices. In this way, it is possible to support a scenario in which the layer-2 member links under the layer-3 bundled link respectively belong to different network slices, therefore the division flexibility of the network slices can be improved, and traffic differentiation and isolation between the network slices can be realized.

Figure 5:
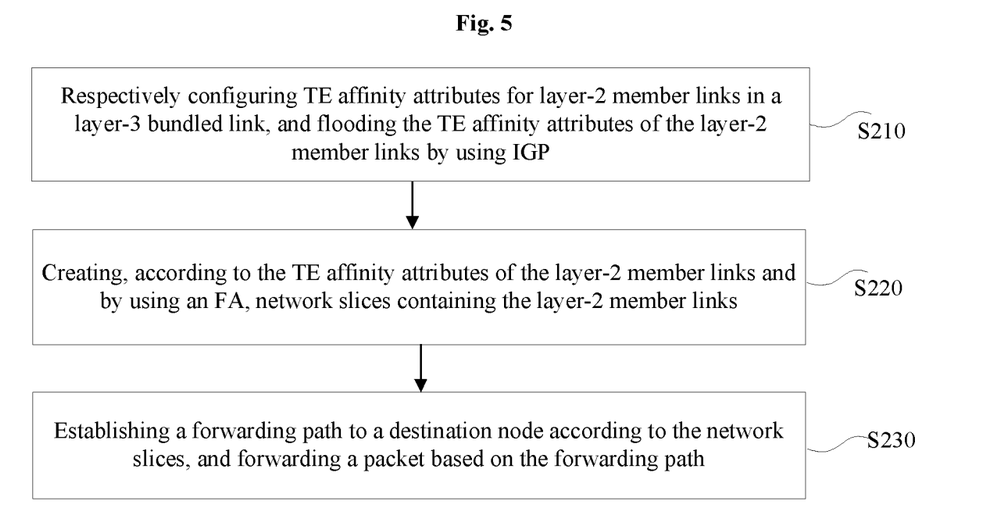
FIG. 5 is a flowchart of a packet forwarding method provided by an embodiment of the present disclosure.

In addition, as shown in FIG. 5, FIG. 5 is a flowchart of a packet forwarding method provided by an embodiment of the present disclosure. The packet forwarding method includes, but is not limited to, the following operations.

At operation S210, TE affinity attributes are respectively configured for layer-2 member links in a layer-3 bundled link, and the TE affinity attributes of the layer-2 member links are flooded by using IGP.

At operation S220, network slices containing the layer-2 member links are created according to the TE affinity attributes of the layer-2 member links and by using an FA.

At operation S230, a forwarding path to a destination node is established according to the network slices, and a packet is forwarded based on the forwarding path.

The packet forwarding method in the present embodiment and the network slice creation method in the foregoing embodiment can both be applied to the network topology in the embodiment shown in FIG. 1. In particular, the packet forwarding method in the present embodiment may be a further application based on the network slice creation method in the foregoing embodiment. Based on the network slice creation method in the foregoing embodiment, the packet forwarding method in the present embodiment further performs packet forwarding by using the network slices of the layer-2 member links containing the corresponding TE affinity attributes, therefore not only can a specific layer-2 member link be specified as a forwarding outbound interface in a packet forwarding process, but traffic differentiation and isolation between the network slices can also be realized.

Only the difference between the packet forwarding method in the present embodiment and the network slice creation method in the foregoing embodiment will be described in detail below. For the same content between the two methods, reference can be made to the detailed description of the network slice creation method in the foregoing embodiment, and thus will not be repeated herein.

In an embodiment, after the network slices containing the layer-2 member links are created according to the TE affinity attributes of the layer-2 member links and by using the FA, it is possible to establish the forwarding path to the destination node according to the network slices, and forward the packet based on the forwarding path.

At present, the commonly used FA technology cannot support a scenario in which the layer-2 member links respectively belong to different network slices. Although the current FA technology can define the resources of layer-3 links (including the layer-3 bundled link) contained in a network slice, it cannot more accurately identify which layer-2 member link in the layer-3 bundled link is used as an actual forwarding outbound interface. As a result, when a plurality of network slices share the same layer-3 bundled link, it is impossible to further specify different layer-2 member links to carry the traffics of different network slices, that is, it is impossible to realize the traffic differentiation and isolation between the network slices. In view of this problem, the present embodiment utilizes the above operations S210, S220 and S230, that is, by respectively configuring the TE affinity attributes for the layer-2 member links in the layer-3 bundled link, and flooding the TE affinity attributes of the layer-2 member links by using IGP, each node in the current IGP domain can store the layer-3 bundled link information of all nodes in the current IGP domain, and the layer-3 bundled link information contains specific TE affinity attributes of respective layer-2 member links; in addition, the network slices containing the layer-2 member links are created according to the TE affinity attributes of the layer-2 member links and by using the FA, so that different network slices can correspond to different layer-2 member links. In this way, each network slice can have the TE affinity attribute of one or more corresponding layer-2 member links, that is, one or more layer-2 member links with the same TE affinity attribute can form a network slice. Therefore, it is possible to support a scenario in which the layer-2 member links under the layer-3 bundled link respectively belong to different network slices, and the division flexibility of the network slices can be improved. In addition, by establishing the forwarding path to the destination node according to the network slices, and forwarding the packet based on the forwarding path, when a service packet in the network slice is forwarded, a specific layer-2 member link can be specified as a forwarding outbound interface according to the TE affinity attribute of the layer-2 member link that constitute the network slice, not only can traffic differentiation and isolation between the network slices be realized, but the specific forwarding paths of the service packets in the layer-2 member links can also be determined, therefore it is possible to conveniently perform analysis and management on the service packets in different network slices.

Figure 6:
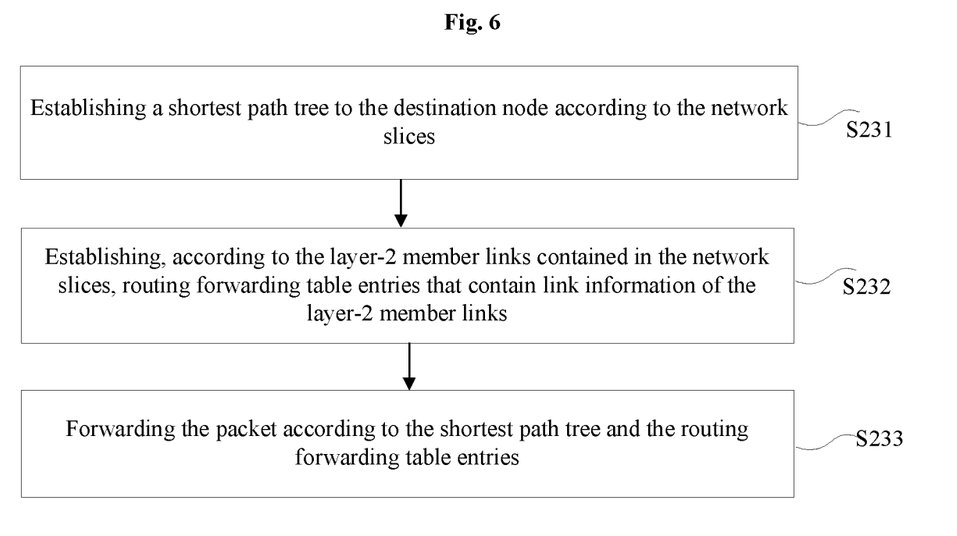
FIG. 6 is a flowchart of a packet forwarding method provided by another embodiment of the present disclosure.

As shown in FIG. 6, in an embodiment, the operation S230 includes, but is not limited to, the following operations.

At operation S231, a shortest path tree to the destination node is established according to the network slices.

At operation S232, routing forwarding table entries that contain link information of the layer-2 member links are established according to the layer-2 member links contained in the network slices.

At operation S233, the packet is forwarded according to the shortest path tree and the routing forwarding table entries.

In an embodiment, after the network slices containing the corresponding layer-2 member links are created according to the TE affinity attributes, each node in the network slice uses itself as a root node to create the shortest path tree in the network slice, according to the shortest path trees corresponding to different root nodes, the nodes in the network slice may obtain paths to other destination nodes. According to the TE affinity attributes of the layer-2 member links corresponding to the network slice, each node can identify the network slice attributes of the layer-2 member links in the layer-3 bundled link, therefore, the established routing forwarding table entries may include specific layer-3 bundled link information corresponding to different network slices and layer-2 member link information. When the packet is forwarded according to the shortest path tree and the routing forwarding table entries, if the specified forwarding outbound interface in a routing forwarding table entry is a layer-3 bundled link, then according to the TE affinity attributes of the layer-2 member links under the layer-3 bundled link and the network slices containing the layer-2 member links, a specific layer-2 member link may be selected as an actual forwarding outbound interface of the routing forwarding table entry, not only can traffic differentiation and isolation between the network slices be realized, but the specific forwarding paths of the service packets in the layer-2 member links can also be determined, therefore it is possible to conveniently perform analysis and management on the service packets in different network slices.

Figure 7:
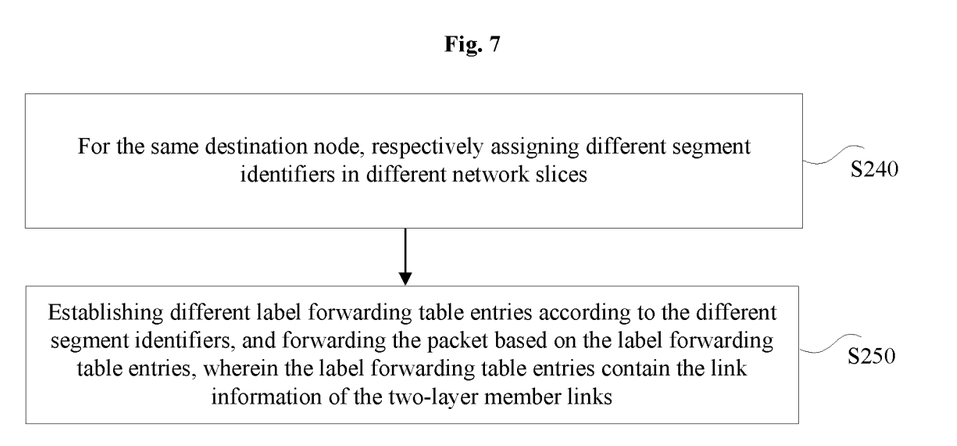
FIG. 7 is a flowchart of a packet forwarding method provided by another embodiment of the present disclosure.

As shown in FIG. 7, in an embodiment, the packet forwarding method may further include the following operations.

At operation S240, for a same destination node, different segment identifiers are respectively assigned in different network slices.

At operation S250, different label forwarding table entries are established according to the different segment identifiers, and the packet is forwarded based on the label forwarding table entries, wherein the label forwarding table entries contain the link information of the layer-2 member links.

In an embodiment, in the case where there are different network slices between the current node and the same destination node, different segment identifiers may be respectively assigned to different network slices, so as to distinguish the different network slices. Then, different label forwarding table entries are established according to the different segment identifiers, and the label forwarding table entries contain the link information of the layer-2 member links, therefore when a packet needs to be forwarded, the packet can be forwarded based on the different label forwarding table entries. Therefore, it is possible to realize traffic differentiation and isolation between the network slices.

In addition, in an embodiment, in a case where IGP is ISIS protocol, fields for representing the TE affinity attributes of the layer-2 member links are set in an ISIS protocol message.

In an embodiment, after the TE affinity attributes are respectively configured for the layer-2 member links in the layer-3 bundled link, in a case where IGP is ISIS protocol, with reference to the message structure shown in FIG. 4, fields for representing the TE affinity attributes of the layer-2 member links may be set in the ISIS protocol message, therefore by the flooding of the ISIS protocol message, the TE affinity attributes of the layer-2 member links may be notified to various nodes, such that the link state databases in the nodes may store the TE affinity attributes corresponding to different layer-2 member links. Therefore, according to one or more layer-2 member links with the same TE affinity attribute, network slices for different dedicated service traffics can be realized between different nodes. As a result, it is possible to support a scenario in which the layer-2 member links under the layer-3 bundled link respectively belong to different network slices, the division flexibility of the network slices can be improved, and accordingly traffic differentiation and isolation between the network slices can be realized.

In addition, in an embodiment, a link resource selection rule is correspondingly provided for each network slice, and the link resource selection rule is used for selecting one or more layer-2 member links with a corresponding TE affinity attribute.

In the present embodiment, since the network slices containing the layer-2 member links are created according to the TE affinity attributes of the layer-2 member links and by using the FA, each network slice can correspondingly have a link resource selection rule, and the link resource selection rule is used for selecting one or more layer-2 member links with a corresponding TE affinity attribute. Therefore, just by respectively configuring the TE affinity attributes for the layer-2 member links, and flooding the TE affinity attributes of the layer-2 member links by using IGP, corresponding layer-2 member links can constitute a network slice according to the same TE affinity attribute. One layer-3 bundled link contains a plurality of layer-2 member links, and the layer-2 member links have different TE affinity attributes, therefore one layer-3 bundled link can be divided into a plurality of different network slices. In this way, it is possible to support a scenario in which the layer-2 member links under the layer-3 bundled link respectively belong to different network slices, and then the division flexibility of the network slices can be improved. Moreover, since each network slice selects, according to the link resource selection rule, the layer-2 member links with corresponding TE affinity attributes, when service packets in different network slices are forwarded, a specific layer-2 member link can be specified as a forwarding outbound interface according to the TE affinity attributes, such that traffic differentiation and isolation between the network slices can be realized.

The packet forwarding method provided by the embodiment of the present disclosure will be described in detail below by way of specific examples.

Example 1

Figure 8:
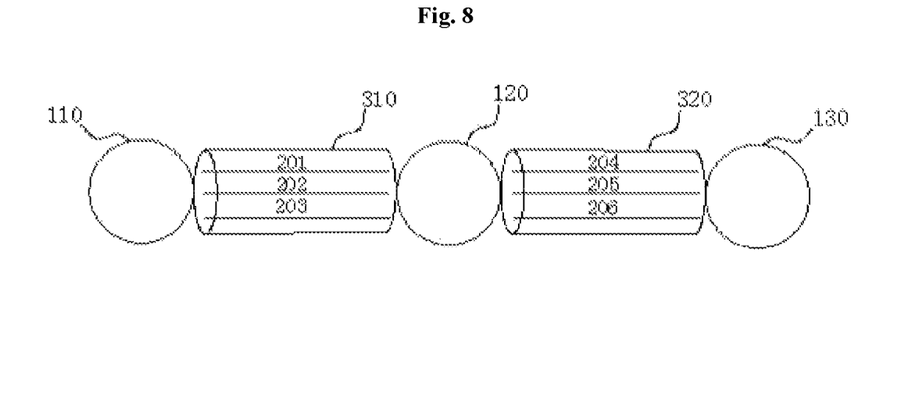
FIG. 8 is a schematic diagram of a network topology for executing a packet forwarding method provided by an embodiment of the present disclosure.

As shown in FIG. 8, FIG. 8 is a schematic diagram of a network topology in which all network slices are homogeneous networks. A homogeneous network refers to a network in which virtual network topology diagrams corresponding to the network slices are the same, that is, all the network slices synchronously share resources in each node in an underlying physical network and each link resource.

The network topology shown in FIG. 8 includes a first node 110, a second node 120 and a third node 130, which are connected in sequence. The first node 110, the second node 120 and the third node 130 constitute an IGP domain (such as an ISIS protocol domain). In addition, a first flexible Ethernet link 201, a second flexible Ethernet link 202 and a third flexible Ethernet link 203 are arranged in parallel between the first node 110 and the second node 120, and a fourth flexible Ethernet link 204, a fifth flexible Ethernet link 205 and a sixth flexible Ethernet link 206 are arranged in parallel between the second node 120 and the third node 130. When a packet forwarding method is executed based on the network topology shown in FIG. 8, the specific operations are as follows.

First, a first layer-3 bundled link 310 is created between the first node 110 and the second node 120. The first flexible Ethernet link 201, the second flexible Ethernet link 202 and the third flexible Ethernet link 203 are allocated to the first layer-3 bundled link 310 as layer-2 member links. Specific TE affinity attributes are respectively configured for the first flexible Ethernet link 201, the second flexible Ethernet link 202 and the third flexible Ethernet link 203, for example, the TE affinity attribute of the first flexible Ethernet link 201 is configured to be "red", the TE affinity attribute of the second flexible Ethernet link 202 is configured to be "blue", and the TE affinity attribute of the third flexible Ethernet link 203 is configured to be "green". Similarly, a second layer-3 bundled link 320 is created between the second node 120 and the third node 130. The fourth flexible Ethernet link 204, the fifth flexible Ethernet link 205 and the sixth flexible Ethernet link 206 are allocated to the second layer-3 bundled link 320 as layer-2 member links. Specific TE affinity attributes are respectively configured for the fourth flexible Ethernet link 204, the fifth flexible Ethernet link 205 and the sixth flexible Ethernet link 206, for example, the TE affinity attribute of the fourth flexible Ethernet link 204 is configured to be "red", the TE affinity attribute of the fifth flexible Ethernet link 205 is configured to be "blue", and the TE affinity attribute of the sixth flexible Ethernet link 206 is configured to be "green".

Next, ISIS protocol messages are respectively configured in the first node 110, the second node 120 and the third node 130, IP addresses are respectively configured for the first layer-3 bundled link 310 and the second layer-3 bundled link 320, and the IP addresses are added into the configured ISIS protocol messages.

Then, the first node 110, the second node 120 and the third node 130 respectively flood link state data by using IGP, that is, the first node 110, the second node 120 and the third node 130 correspondingly flood the link state data of the first layer-3 bundled link 310, the second layer-3 bundled link 320, the first flexible Ethernet link 201, the second flexible Ethernet link 202, the third flexible Ethernet link 203, the fourth flexible Ethernet link 204, the fifth flexible Ethernet link 205 and the sixth flexible Ethernet link 206, respectively. In addition, the first node 110, the second node 120, and the third node 130 all maintain a consistent link state database, and the link state database records the TE affinity attribute of each link, for example, all the TE affinity attributes of the first layer-3 bundled link 310 and the second layer-3 bundled link 320 recorded in the link state database include "red", "blue" and "green", the TE affinity attributes of the first flexible Ethernet link 201 and the fourth flexible Ethernet link 204 recorded in the link state database are both "red", the TE affinity attributes of the second flexible Ethernet link 202 and the fifth flexible Ethernet link 205 recorded in the link state database are both "blue", and the TE affinity attributes of the third flexible Ethernet link 203 and the sixth flexible Ethernet link 206 recorded in the link state database are both "green".

Next, according to the TE affinity attributes of the layer-2 member links and by using an FA, network slices corresponding to the layer-2 member links are created, for example, FA-id 128, FA-id 129 and FA-id 130 are respectively configured and enabled on the first node 110, the second node 120 and the third node 130, so as to create a first network slice, a second network slice and a third network slice. The first network slice contains link resources of the first flexible Ethernet link 201 and the fourth flexible Ethernet link 204 with the TE affinity attributes of "red", the second network slice contains link resources of the second flexible Ethernet link 202 and the fifth flexible Ethernet link 205 with the TE affinity attributes of "blue", and the third network slice contains link resources of the third flexible Ethernet link 203 and the sixth flexible Ethernet link 206 with the TE affinity attributes of "green". After the creation, the first network slice contains the first node 110, the second node 120, the third node 130, the first flexible Ethernet link 201 and the fourth flexible Ethernet link 204; the second network slice contains the first node 110, the second node 120, the third node 130, the second flexible Ethernet link 202 and the fifth flexible Ethernet link 205; and the third network slice contains the first node 110, the second node 120, the third node 130, the third flexible Ethernet link 203 and the sixth flexible Ethernet link 206.

Then, for the first network slice, the first node 110, the second node 120 and the third node 130 all use themselves as root nodes to establish routing forwarding table entries with a destination node, so as to realize packet forwarding. Specifically, assuming that the third node 130 is the destination node of the first node 110, then the first node 110 uses itself as the root node to establish a forwarding path and a routing forwarding table entry with the third node 130, configures the first layer-3 bundled link 310 as a forwarding outbound interface in the routing forwarding table entry, and selects the first flexible Ethernet link 201 as an actual forwarding outbound interface, so as to realize packet forwarding. The packet forwarding in the second network slice and the third network slice is similar to the above-mentioned process of packet forwarding in the first network slice, and in order to avoid redundancy, details are not repeated here. In the present example, by using the network slices with the TE affinity attributes to perform packet forwarding, not only can a specific layer-2 member link be specified as the forwarding outbound interface in a packet forwarding process, but traffic differentiation and isolation between the network slices can also be realized.

Example 2

Figure 9:
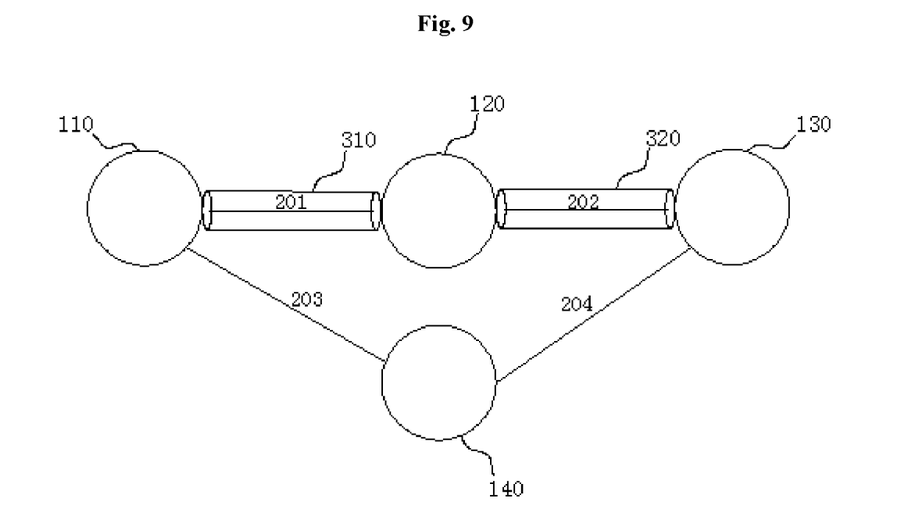
FIG. 9 is a schematic diagram of a network topology for executing a packet forwarding method provided by another embodiment of the present disclosure.

As shown in FIG. 9, FIG. 9 is a schematic diagram of a network topology in which network slices are heterogeneous networks. A heterogeneous network refers to a network in which virtual network topology diagrams corresponding to the network slices are different, that is, a part of network sources is only shared by a part of network slices, and the other part of network sources is shared by the other part of network slices.

The network topology shown in FIG. 9 includes a first node 110, a second node 120, a third node 130 and a fourth node 140, which are connected in sequence, wherein the first node 110, the second node 120, the third node 130 and the fourth node 140 constitute an IGP domain (such as an ISIS protocol domain). In addition, a first flexible Ethernet link 201 is arranged between the first node 110 and the second node 120, a second flexible Ethernet link 202 is arranged between the second node 120 and the third node 130, a third flexible Ethernet link 203 is arranged between the first node 110 and the fourth node 140, and a fourth flexible Ethernet link 204 is arranged between the fourth node 140 and the third node 130. In order to conveniently add new links between the first node 110 and the second node 120, and between the second node 120 and the third node 130 subsequently, a first layer-3 bundled link 310 and a second layer-3 bundled link 320 may be correspondingly created, wherein the first flexible Ethernet link 201 is a layer-2 member link of the first layer-3 bundled link 310, and the second flexible Ethernet link 202 is the layer-2 member link of the second layer-3 bundled link 320. Since the link sources between the first node 110 and the fourth node 140, and between the fourth node 140 and the third node 130 are limited, no corresponding layer-3 bundled link is created.

When a packet forwarding method is executed based on the network topology shown in FIG. 9, the specific operations are as follows.

First, the first layer-3 bundled link 310 is created between the first node 110 and the second node 120, the first flexible Ethernet link 201 is allocated to the first layer-3 bundled link 310 as the layer-2 member link, and a specific TE affinity attribute is configured for the first flexible Ethernet link 201, for example, the TE affinity attribute of the first flexible Ethernet link 201 is configured to be "red". Similarly, the second layer-3 bundled link 320 is created between the second node 120 and the third node 130, the second flexible Ethernet link 202 is allocated to the second layer-3 bundled link 320 as the layer-2 member link, and a specific TE affinity attribute is configured for the second flexible Ethernet link 202, for example, the TE affinity attribute of the second flexible Ethernet link 202 is configured to be "red". In addition, specific TE affinity attributes are respectively configured for the third flexible Ethernet link 203 and the fourth flexible Ethernet link 204, for example, the TE affinity attributes of the third flexible Ethernet link 203 and the fourth flexible Ethernet link 204 are configured to be "blue".

Next, ISIS protocol messages are respectively configured in the first node 110, the second node 120, the third node 130 and the fourth node 140, IP addresses are respectively configured for the first layer-3 bundled link 310, the second layer-3 bundled link 320, the third flexible Ethernet link 203 and the fourth flexible Ethernet link 204, and the IP addresses are added into the configured ISIS protocol messages.

Then, the first node 110, the second node 120, the third node 130 and the fourth node 140 respectively flood link state data by using IGP, that is, the first node 110, the second node 120, the third node 130 and the fourth node 140 correspondingly flood the link state data of the first layer-3 bundled link 310, the second layer-3 bundled link 320, the first flexible Ethernet link 201, the second flexible Ethernet link 202, the third flexible Ethernet link 203 and the fourth flexible Ethernet link 204, respectively. In addition, the first node 110, the second node 120, the third node 130 and the fourth node 140 all maintain a consistent link state database, and the link state database records the TE affinity attribute of each link, for example, the TE affinity attributes of the first layer-3 bundled link 310 and the second layer-3 bundled link 320 recorded in the link state database are both "red", the TE affinity attributes of the first flexible Ethernet link 201 and the second flexible Ethernet link 202 recorded in the link state database are both "red", and the TE affinity attributes of the third flexible Ethernet link 203 and the fourth flexible Ethernet link 204 recorded in the link state database are both "blue".

Next, according to the TE affinity attributes of the layer-2 member links and by using an FA, network slices corresponding to the layer-2 member links are created, for example, FA-id 128 are respectively configured and enabled on the first node 110, the second node 120 and the third node 130, and FA-id 129 are respectively configured and enabled on the first node 110, the fourth node 140 and the third node 130, so as to create a first network slice and a second network slice. The first network slice contains link resources of the first flexible Ethernet link 201 and the second flexible Ethernet link 202 with the TE affinity attributes of "red", and the second network slice contains link resources of the third flexible Ethernet link 203 and the fourth flexible Ethernet link 204 with the TE affinity attributes of "blue". After the creation, the first network slice contains the first node 110, the second node 120, the third node 130, the first flexible Ethernet link 201 and the second flexible Ethernet link 202; and the second network slice contains the first node 110, the fourth node 140, the third node 130, the third flexible Ethernet link 203 and the fourth flexible Ethernet link 204.

Then, for the first network slice, the first node 110, the second node 120 and the third node 130 all use themselves as root nodes to establish routing forwarding table entries with a destination node, so as to realize packet forwarding. Specifically, assuming that the third node 130 is the destination node of the first node 110, then the first node 110 uses itself as the root node to establish a forwarding path to the third node 130 and a routing forwarding table entry, configures the first layer-3 bundled link 310 as a forwarding outbound interface in the routing forwarding table entry, and selects the first flexible Ethernet link 201 as an actual forwarding outbound interface, so as to realize packet forwarding. The packet forwarding in the second network slice is similar to the above-mentioned process of packet forwarding in the first network slice, and in order to avoid redundancy, details are not repeated here. In the present example, by using the network slices with the TE affinity attributes to perform packet forwarding, not only can a specific layer-2 member link be specified as the forwarding outbound interface in a packet forwarding process, but traffic differentiation and isolation between the network slices can also be realized.

In addition, an embodiment of the present disclosure provides a network slice creation apparatus. The network slice creation apparatus includes: a memory, a processor, and a computer program stored on the memory and executable on the processor.

The processor and the memory may be connected by a bus or in other ways.

It should be illustrated that, the network slice creation apparatus in the present embodiment may be applied to different nodes or network controllers in the embodiment shown in FIG. 1, which include the nodes or network controllers provided with the network slice creation apparatus in the present embodiment. The network slice creation apparatus may constitute a part of the network topology in the embodiment shown in FIG. 1. The network slice creation apparatus and the network slice creation method belong to the same inventive concept, so they have the same implementation principles and beneficial effects, and thus will not be described in detail here.

Non-transitory software programs and instructions required to implement the network slice creation method in the foregoing embodiment are stored in the memory, and when executed by the processor, execute the network slice creation method in the foregoing embodiment, for example, execute operations S110 to S120 of the method in FIG. 3 as described above.

In addition, another embodiment of the present disclosure provides a packet forwarding apparatus. The packet forwarding apparatus includes: a memory, a processor, and a computer program stored on the memory and executable on the processor.

The processor and the memory may be connected by a bus or in other ways.

It should be illustrated that, the packet forwarding apparatus in the present embodiment may be applied to different nodes in the embodiment shown in FIG. 1, which include the nodes provided with the packet forwarding apparatus in the present embodiment. The packet forwarding apparatus may constitute a part of the network topology in the embodiment shown in FIG. 1. The packet forwarding apparatus and the packet forwarding method belong to the same inventive concept, so they have the same implementation principles and beneficial effects, and thus will not be described in detail here.

Non-transitory software programs and instructions required to implement the packet forwarding method in the foregoing embodiment are stored in the memory, and when executed by the processor, execute the packet forwarding method in the foregoing embodiment, for example, execute operations S210 to S230 of the method in FIG. 5, operations S231 to S232 of the method in FIG. 6 and operations S240 to S250 of the method in FIG. 7 as described above.

The apparatus embodiments described above are only illustrative, wherein units described as separate components may be separated physically or not, namely, may be located in one place, or may be distributed on a plurality of units. A part of or all of the modules may be selected to implement the purposes of the solutions in the present embodiment according to actual demands.

In addition, an embodiment of the present disclosure provides a computer-readable storage medium, in which computer-executable instructions are stored, wherein the computer-executable instructions are executed by a processor or controller, for example, executed by a processor of the network slice creation apparatus in the foregoing embodiment, so that the processor executes the network slice creation method in the foregoing embodiment, for example, executes operations S110 to S120 of the method in FIG. 3 as described above. As another example, the computer-executable instructions are executed by a processor in the packet forwarding apparatus in the foregoing embodiment, so that the processor executes the packet forwarding method in the foregoing embodiment, for example, executes operations S210 to S230 of the method in FIG. 5, operations S231 to S232 of the method in FIG. 6 and operations S240 to S250 of the method in FIG. 7 as described above.

Those having ordinary skill in the art can understand that, all or some of operations in the methods disclosed above, and systems may be implemented as software, firmware, hardware and appropriate combinations thereof. Some or all physical components may be implemented as software executed by a processor, such as a central processing unit, a digital signal processor or a microprocessor, or implemented as hardware, or implemented as an integrated circuit, such as an application-specific integrated circuit. Such software may be distributed on a computer-readable medium, and the computer-readable medium may include a computer storage medium (or a non-transitory medium) and a communication medium (or a transitory medium). As is well known to those having ordinary skill in the art, the term computer storage medium includes volatile and nonvolatile media, and removable and non-removable media, which are implemented in any method or technology for storing information (such as computer-readable instructions, data structures, program modules or other data). The computer storage medium includes, but is not limited to, an RAM, an ROM, an EEPROM, a flash memory or other memory technologies, a CD-ROM, a digital versatile disk (DVD) or other optical disk memories, a magnetic cartridge, a magnetic tape, a magnetic disk storage apparatus or other magnetic storage apparatuses, or any other media that can be used for storing desired information and can be accessed by a computer. In addition, as is well known to those having ordinary skill in the art, the communication medium typically includes computer-readable instructions, data structures, program modules or other data in modulated data signals such as carriers or other transport mechanisms, and may include any information delivery medium.

A specific description of preferred implementations of the present disclosure has been given above, but the present disclosure is not limited to the above-mentioned embodiments, those having ordinary skill in the art can make various equivalent deformations or replacements without departing from the spirits of the present disclosure, and these equivalent deformations or replacements are all included within the scope defined by the claims of the present disclosure.

What is claimed is:

1. A network slice creation method, comprising:
respectively configuring Traffic Engineering (TE) affinity attributes for layer-2 member links in a layer-3 bundled link, and flooding the TE affinity attributes of the layer-2 member links by using Interior Gateway Protocol (IGP); and
creating, according to the TE affinity attributes of the layer-2 member links and by using a Flex Algorithm (FA), network slices containing the layer-2 member links.

2. The network slice creation method according to claim 1, wherein in a case where IGP is Intermediate System to Intermediate System (ISIS) protocol, fields for representing the TE affinity attributes of the layer-2 member links are set in an ISIS protocol message.

3. The network slice creation method according to claim 1, wherein a link resource selection rule is correspondingly provided for each network slice, and the link resource selection rule is used for selecting one or more layer-2 member links with a corresponding TE affinity attribute.

4. The network slice creation method according to claim 1, wherein flooding the TE affinity attributes of the layer-2 member links by using IGP comprises one of:
notifying the TE affinity attributes of the layer-2 member links in the layer-3 bundled link by extending Intermediate System to Intermediate System (ISIS) protocol;
notifying the TE affinity attributes of the layer-2 member links in the layer-3 bundled link by extending Open Shortest Path First (OSPF) protocol.

5. The network slice creation method according to claim 4, wherein
when the TE affinity attributes of the layer-2 member links in the layer-3 bundled link are notified by extending ISIS protocol, the TE affinity attributes are configured by adding new fields in an ISIS protocol message, and distributing the ISIS protocol message, that is configured with the TE affinity attributes, via flooding.

6. The network slice creation method according to claim 4, wherein
when the TE affinity attributes of the layer-2 member links in the layer-3 bundled link are notified by extending OSPF protocol, the TE affinity attributes are configured according to provisions of OSPF protocol, and an OSPF protocol message that is configured with the TE affinity attributes is distributed via flooding.

7. The network slice creation method according to claim 1, wherein different algorithm constraint conditions of the FA are defined for different network slices, and corresponding to the TE affinity attributes of the layer-2 member links, the layer-2 member links that satisfy different algorithm constraint conditions constitute different network slices.

8. The network slice creation method according to claim 2, wherein in the fields for representing the TE affinity attributes of the layer-2 member links, the TE affinity attribute of each layer-2 member link is listed in a sequence in which identifiers of the layer-2 member links are listed.

9. A packet forwarding method, comprising operations in the network slice creation method according to claim 1, and after creating, according to the TE affinity attributes of the layer-2 member links and by using the FA, the network slices containing the layer-2 member links, further comprising:
establishing a forwarding path to a destination node according to the network slices, and forwarding a packet based on the forwarding path.

10. The packet forwarding method according to claim 9, wherein establishing the forwarding path to the destination node according to the network slices, and forwarding the packet based on the forwarding path comprises:
establishing a shortest path tree to the destination node according to the network slices;
establishing, according to the layer-2 member links contained in the network slices, routing forwarding table entries that contain link information of the layer-2 member links; and
forwarding the packet according to the shortest path tree and the routing forwarding table entries.

11. The packet forwarding method according to claim 10, further comprising:
for a same destination node, respectively assigning different segment identifiers in different network slices; and
establishing different label forwarding table entries according to the different segment identifiers, and forwarding the packet based on the label forwarding table entries, wherein the label forwarding table entries contain the link information of the layer-2 member links.

12. The packet forwarding method according to claim 9, wherein a link resource selection rule is correspondingly provided for each network slice, and the link resource selection rule is used for selecting one or more layer-2 member links with a corresponding TE affinity attribute.

13. A packet forwarding apparatus, comprising: a memory, a processor, and a computer program stored on the memory and executable on the processor, wherein when executing the computer program, the processor implements the packet forwarding method of claim 9.

14. The packet forwarding method according to claim 9, wherein in a case where IGP is Intermediate System to Intermediate System (ISIS) protocol, fields for representing the TE affinity attributes of the layer-2 member links are set in an ISIS protocol message.

15. The packet forwarding method according to claim 9, wherein flooding the TE affinity attributes of the layer-2 member links by using IGP comprises one of:
notifying the TE affinity attributes of the layer-2 member links in the layer-3 bundled link by extending Intermediate System to Intermediate System (ISIS) protocol;
notifying the TE affinity attributes of the layer-2 member links in the layer-3 bundled link by extending Open Shortest Path First (OSPF) protocol.

16. The packet forwarding method according to claim 15, wherein
when the TE affinity attributes of the layer-2 member links in the layer-3 bundled link are notified by extending ISIS protocol, the TE affinity attributes are configured by adding new fields in an ISIS protocol message, and distributing the ISIS protocol message, that is configured with the TE affinity attributes, via flooding; or,
when the TE affinity attributes of the layer-2 member links in the layer-3 bundled link are notified by extending OSPF protocol, the TE affinity attributes are configured according to provisions of OSPF protocol, and an OSPF protocol message that is configured with the TE affinity attributes is distributed via flooding.

17. The packet forwarding method according to claim 9, wherein different algorithm constraint conditions of the FA are defined for different network slices, and corresponding to the TE affinity attributes of the layer-2 member links, the layer-2 member links that satisfy different algorithm constraint conditions constitute different network slices.

18. A non-transitory computer-readable storage medium, in which computer-executable instructions are stored, wherein the computer-executable instructions are used for executing the packet forwarding method of claim 9.

19. A network slice creation apparatus, comprising: a memory, a processor, and a computer program stored on the memory and executable on the processor, wherein when executing the computer program, the processor implements the network slice creation method of claim 1.

20. A non-transitory computer-readable storage medium, in which computer-executable instructions are stored, wherein the computer-executable instructions are used for executing the network slice creation method of claim 1.

* * * * *